US008077676B2

(12) United States Patent
Chang

(10) Patent No.: US 8,077,676 B2
(45) Date of Patent: Dec. 13, 2011

(54) SYSTEM AND METHOD FOR WIRELESS CHANNEL SENSING

(75) Inventor: Soo-Young Chang, Davis, CA (US)

(73) Assignee: FutureWei Technologies, Inc., Plano, TX (US)

( * ) Notice: Subject to any disclaimer, the term of this patent is extended or adjusted under 35 U.S.C. 154(b) by 869 days.

(21) Appl. No.: 11/681,639

(22) Filed: Mar. 2, 2007

(65) Prior Publication Data
US 2008/0165680 A1 Jul. 10, 2008

Related U.S. Application Data

(60) Provisional application No. 60/883,810, filed on Jan. 7, 2007.

(51) Int. Cl.
H04W 4/00 (2009.01)
(52) U.S. Cl. ............... 370/332; 455/67.11; 455/423
(58) Field of Classification Search .............. 455/76, 455/78, 208; 370/230; 348/845.3; 725/100; 708/409
See application file for complete search history.

(56) References Cited

U.S. PATENT DOCUMENTS

| 5,203,012 A | | 4/1993 | Patsiokas et al. | |
| 5,903,324 A | * | 5/1999 | Lyons et al. | 348/845.3 |
| 6,389,270 B1 | * | 5/2002 | Nohrden et al. | 455/161.1 |
| 6,434,583 B1 | * | 8/2002 | Dapper et al. | 708/409 |
| 6,694,129 B2 | * | 2/2004 | Peterzell et al. | 455/76 |
| 6,782,262 B1 | | 8/2004 | Lundborg | |
| 2007/0157269 A1 | * | 7/2007 | Visotsky et al. | 725/100 |

FOREIGN PATENT DOCUMENTS

| CN | 1218592 (A) | 6/1999 |
| CN | 1464650 (A) | 12/2003 |

OTHER PUBLICATIONS

Chang, S-Y., et al., "Waveform Modulated WRAN System," IEEE P802.22 Wireless RANs, Nov. 11, 2007, doc.: IEEE 802.22-05/0107r0.

* cited by examiner

Primary Examiner — Kamran Afshar
Assistant Examiner — Shahriar Behnamian
(74) Attorney, Agent, or Firm — Slater & Matsil, L.L.P.

(57) ABSTRACT

System and method for wireless channel sensing. According to an embodiment, the present invention provides a method of determining band availability for a WRAN. The method includes receiving wirelessly analog signals within a predetermined range of frequencies. The method also includes converting the analog signals to digital signals. The digital signals are characterized in a frequency domain. The method additionally includes determining a plurality of signal strength levels associated with the digital signals at a plurality of frequencies. Furthermore, the method includes comparing the plurality of signal strength levels to reference levels at the plurality of frequencies. Moreover, the method includes determining band availability for wireless communication at the predetermined range of frequencies.

35 Claims, 20 Drawing Sheets

SYSTEM AND METHOD FOR WIRELESS CHANNEL SENSING

CROSS-REFERENCES TO RELATED APPLICATIONS

This application claims priority to U.S. Provisional Application No. 60/883,810, filed Jan. 7, 2007, which is incorporated by reference herein.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This application is directed to wireless communication networks. More specifically, various embodiments of the present invention are used in wireless regional area networks. In particular, a specific embodiment of the present invention is implemented in compliance with the IEEE 802.22 standard to sense and/or detect available wireless communication channels within the television broadcasting frequency range. For example, embodiments of the present invention use a correlation method to determine frequency band availability. It is to be understood that embodiments of the present invention has a broad range of applicability and may be implemented for use in various types of wireless networks.

Wireless communication is one of the most important innovations in the twentieth century. One of the most important objectives of wireless communications and even general "radio" systems is to provide flexibility for different environments and requirements/restrictions and higher spectral and power efficiency in transmission, especially with confined frequency resources.

To fully appreciate and exploit the advantages of wireless communication systems, various concepts have been adopted in designing communication systems. With the advent of communication technologies and rapid increase of processing power of computers, it is often desirable and sometimes even necessary to adopt new system concepts and standards so that more intelligent systems can be implemented. For example, smart radio, software defined radio (SDR), reconfigurable radio, and cognitive radio, are being developed.

One aspect that needs improvement is the efficiency of spectral usage for a given frequency resource, especially for wireless communication systems. As of today, an increasing number of communication systems use wireless channels. As a result, many frequency bands are occupied by and assigned to the rapidly increasing applications and services. As a growing number of bands become assigned and occupied, the number of available bands becomes fewer and fewer. In addition, for a given frequency band, it is often a prerequisite to use this frequency band more efficiently without interference with other users.

In light of the above, more spectrally efficient systems need to be designed and new system concepts/technologies should be devised. One approach which is considered in this invention is that the frequency bands which are already assigned to other users are utilized opportunistically when the incumbent users do not operate in the bands. For example, in a related application Ser. No. 11/680,609 discloses a system for utilizing available television frequency bands for a wide regional area network (WRAN).

As discussed in the related application, it is well known that on the average, only around 40 percent of the TV broadcast bands are utilized at one instant. That is, the rest of 60 percent of the TV bands at one instant can be used for other applications/services provided that the spectral usage by the new services/applications does not interfere with the incumbent user signals. One specific application is for wireless regional area networks, for which the IEEE802.22 Working Group is to currently standardizing.

Using television broadcasting frequency bands for wireless networking has a great potential. In the Unite States, a typical local television broadcast area in the uses approximately 7 high-power channels out of the 67 available high-power channels that are allocated and reserved for television broadcasting. This means there are many free channels that can be used for wireless communication networks. Recently, the House of Representatives and the Senate passed bills requiring television broadcasts to switch from analog to digital by early 2009. As a result, the 700-MHz band (channels 52 to 69) will be cleared of programming and moved to lower frequencies (channels 2 to 51). The 700-MHz band will be set aside for public-safety emergency transponders and for bidding by wireless networks.

To be able to determine what frequency bands are available for wireless communications, it is often necessary to sense incumbent signals. Over the past, various conventional techniques have been developed for sensing incumbent signals. For example, techniques such as matched filter detection and energy band detection, have been developed. Unfortunately, these conventional techniques are often inadequate, as explained below.

Therefore, it is desired to have an improved method and system for determining wireless channel availability.

BRIEF SUMMARY OF THE INVENTION

This application is directed to wireless communication networks. More specifically, various embodiments of the present invention are used in wireless regional area networks. In particular, a specific embodiment of the present invention is implemented in compliance with the IEEE 802.22 standard to sense and/or detect available wireless communication channels within the television broadcasting frequency range. For example, embodiments of the present invention use a correlation method to determine frequency band availability. It is to be understood that embodiments of the present invention has a broad range of applicability and may be implemented for use in various types of wireless networks.

According to an embodiment, the present invention provides a method of determining band availability for a WRAN. The method includes receiving wirelessly analog signals within a predetermined range of frequencies. The method also includes converting the analog signals to digital signals. The digital signals are characterized in a frequency domain. The method additionally includes determining a plurality of signal strength levels associated with the digital signals at a plurality of frequencies. Furthermore, the method includes comparing the plurality of signal strength levels to reference levels at the plurality of frequencies. Moreover, the method includes determining band availability for wireless communication at the predetermined range of frequencies.

According to yet another embodiment, the present invention provides a system for determining availability of wireless communication links. The system includes an antenna for wirelessly receiving analog signals. The analog signals are within a predetermined range of frequencies. In addition, the analog signals are associated with a time-domain. The system further includes a converting component for converting the analog signals to a first plurality of digital signals. The first plurality of digital signals is associated with a time domain at a predetermined range of frequencies. The system additionally includes a transforming component for providing a second plurality of digital signals. The second plurality of digital signals is associated with a frequency domain. Also, the system includes a detecting component for determining wireless channel availability. The detecting component is configured to determine a plurality of signal strength levels associated with the second plurality of digital signals at a plurality of frequencies. The detecting component is further configured to compare the plurality of signal strength levels to reference levels at the plurality of frequencies and to determine band availability for wireless communication at the predetermined range of frequencies based on the comparing.

According to yet another embodiment, the present invention provides a method for determining availability of wireless communication links. The method includes receiving wirelessly analog signals within a predetermined range of frequencies. The analog signals are associated with a time-domain. The method further includes converting the analog signals to digital signals. The digital signals are characterized in a frequency domain. The digital signals include a first pilot spectral component and a second pilot spectral component. The method also includes determining a ratio of spectral amplitudes between the first pilot component and the second pilot component. The method additionally includes comparing the ratio to a predetermined threshold. Furthermore, the method includes determining band availability for wireless communication at the predetermined range of frequencies based on the comparing.

According to yet another embodiment, the present invention provides a method for determining availability of wireless communication links. The method includes receiving wirelessly analog signals within a predetermined range of frequencies. The analog signals are associated with a time-domain. The method also includes converting the analog signals to digital signals. The digital signals are characterized in a frequency domain. Also, the digital signals include a first pilot spectral component and a second pilot spectral component. The method also includes determining a ratio of spectral amplitudes between the first pilot component and the second pilot component. The method additionally includes comparing the ratio to a predetermined threshold. Furthermore, the method includes determining a plurality of spectral amplitude levels associated with the digital signals at a plurality of frequencies. Moreover, the method includes determining a first band availability metric for wireless communication at the predetermined range of frequencies based on the comparing the ratio. The method also includes comparing the plurality of spectral amplitude levels to reference levels at the plurality of frequencies. In addition, the method includes determining a second band availability metric for wireless communication at the predetermined range of frequencies based on the comparing the plurality of signal strength levels. Further, the method includes determining a third band availability metric based on the first and second band availability metrics.

Various embodiments of the present invention provide many advantages over conventional techniques. Among other things, various embodiments of the present invention are implemented in conjunction with existing systems. In a specific embodiment, a technique for determining available frequency bands is implemented on an integrated WRAN system, which both detects and utilizes available frequency bands. For example, certain embodiments of the present invention are compatible with IEEE 802.22 standard. In addition, various techniques according to the present invention are useful for different types of applications in the communication networks. For example, embodiments of the present invention are useful in detecting incumbent NTSC, DTV, Part 74, and/or other types of signals. Furthermore, in comparison to conventional techniques, embodiments of the present invention are more efficient and reliable. For example, frequency channel detection can be performed using just one set of OFDM symbols. There are other advantages as well.

Various additional objects, features and advantages of the present invention can be more fully appreciated with reference to the detailed description and accompanying drawings that follow.

DETAILED DESCRIPTION OF THE INVENTION

This application is directed to wireless communication networks. More specifically, various embodiments of the present invention are used in wireless regional area networks. In particular, a specific embodiment of the present invention is implemented in compliance with the IEEE 802.22 standard to sense and/or detect available wireless communication channels within the television broadcasting frequency range. For example, embodiments of the present invention use a correlation method to determine frequency band availability. It is to be understood that embodiments of the present invention has a broad range of applicability and may be implemented for use in various types of wireless networks.

As discussed above, one of most important issues in using a wireless communication link is to avoid interference with existing wireless communication links. In applications involving television broadcasting channels, there are many considerations. For example, considerations include broadcast disruption, public safety interference, interference with theaters, churches, school events, and cable services, and so on. These considerations are coupled with a huge number of television channels. For example, in the United States there many television channels with 6 MHz bandwidth:

| VHF low band: | Channels 2-6 | 54-88 MHz |
| VHF high band: | Channels 7-13 | 174-216 MHz |
| UHF band: | Channels 14-69 | 470-806 MHz |

Figure 1:
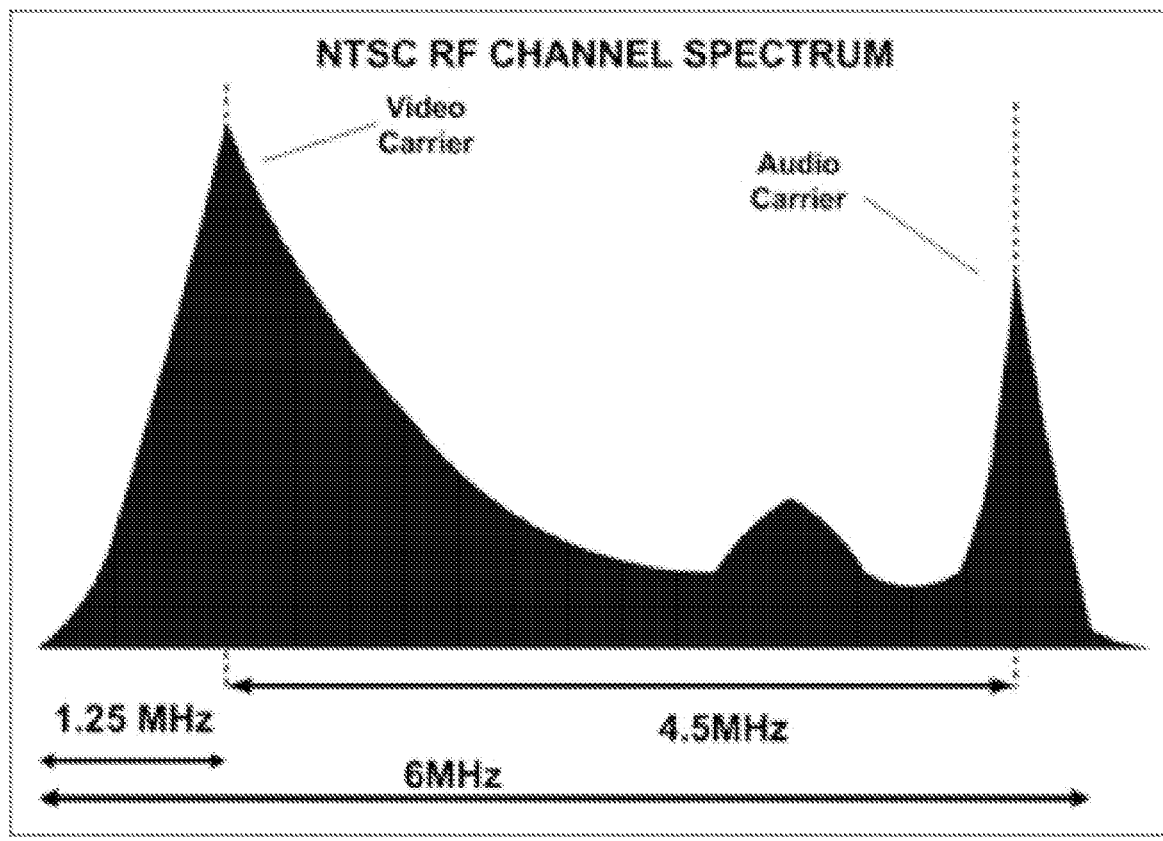
FIG. 1 is a diagram illustrating a NTSC signal spectrum as transmitted through RF frequencies.

FIG. 1 is a diagram illustrating a NTSC signal spectrum as transmitted through RF frequencies. This diagram is merely an example, which should not unduly limit the scope of the claims. One of ordinary skill in the art would recognize many variations, alternatives, and modifications. As an example, the NTSC signal spectrum as shown is representative of television broadcast signals used in the United States.

Once the current television channels are transitioned to digital television broadcasting, the United States will have the following bands:

| VHF low band: | Channels 2-6 | 54-88 MHz |
| VHF high band: | Channels 7-13 | 174-216 MHz |
| UHF band: | Channels 14-51 | 470-698 MHz |

Figure 2:
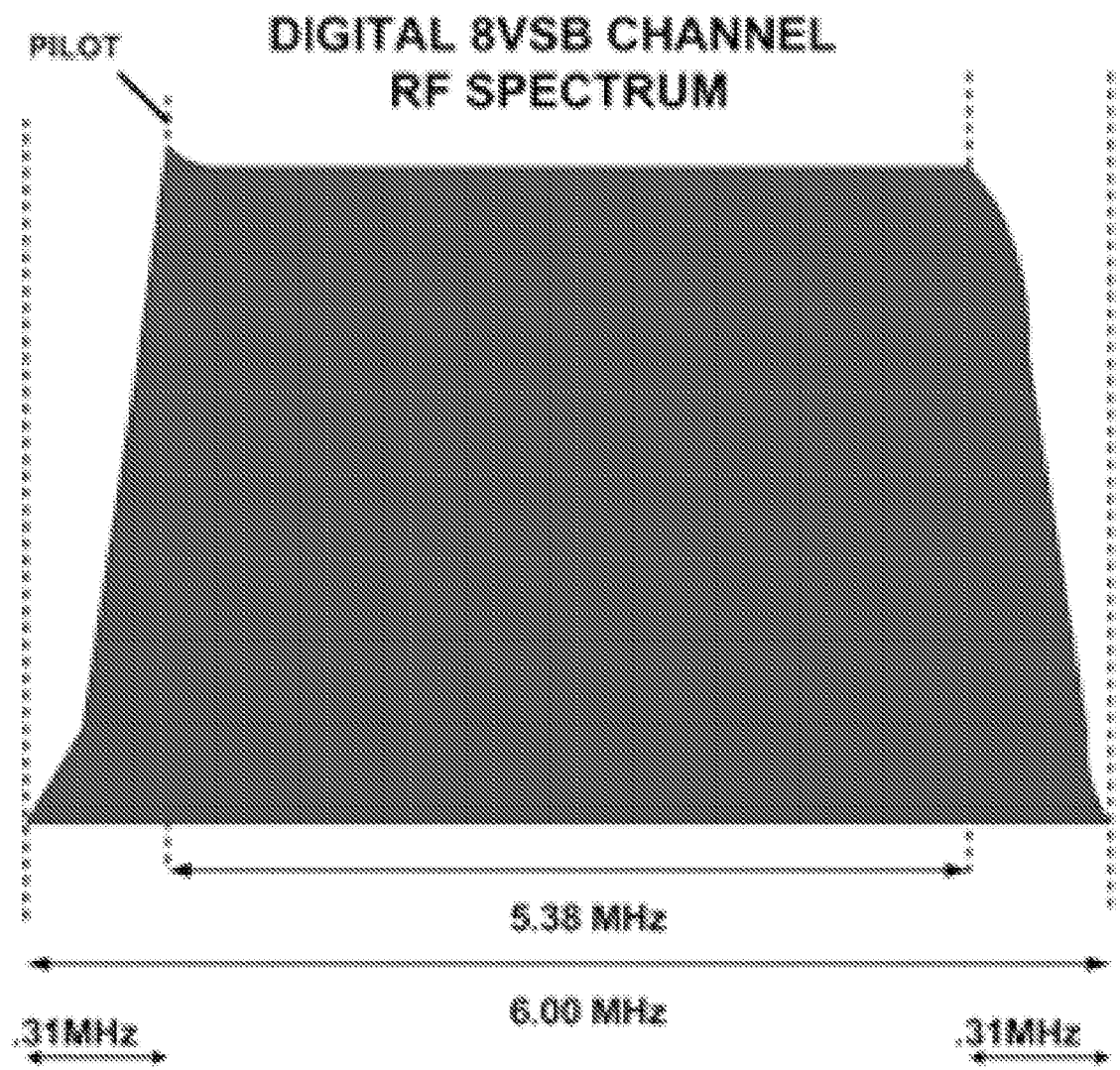
FIG. 2 is a diagram illustrating a DTV signal spectrum as transmitted through RF frequencies.

FIG. 2 is a diagram illustrating a DTV signal spectrum as transmitted through RF frequencies. This diagram is merely an example, which should not unduly limit the scope of the claims. One of ordinary skill in the art would recognize many variations, alternatives, and modifications. As an example, the DTV signal spectrum as shown is representative of television broadcast signals that is currently and will be the United States.

It is to be appreciated that embodiments of the present invention are useful for both existing and future frequency bands. A discussion of these embodiments is presented below.

To be able to use these frequencies, it is important to detect the available frequency bands for efficient and reliable utilization of frequency channels. A system according to the present invention applies the following techniques for reduce interference with incumbent users:

Listen-Before-Talk (LBT)
Geolocation/Database: GPS receivers installed in CPEs
Local beacon: locally transmitted signal used to identify incumbent users.

However, these techniques alone are often inadequate. Among other things, for better reliability a wireless system needs to consistently monitor the incumbent signals before and while it is operated in the same frequency band to avoid interference with incumbent signals.

Figure 3:
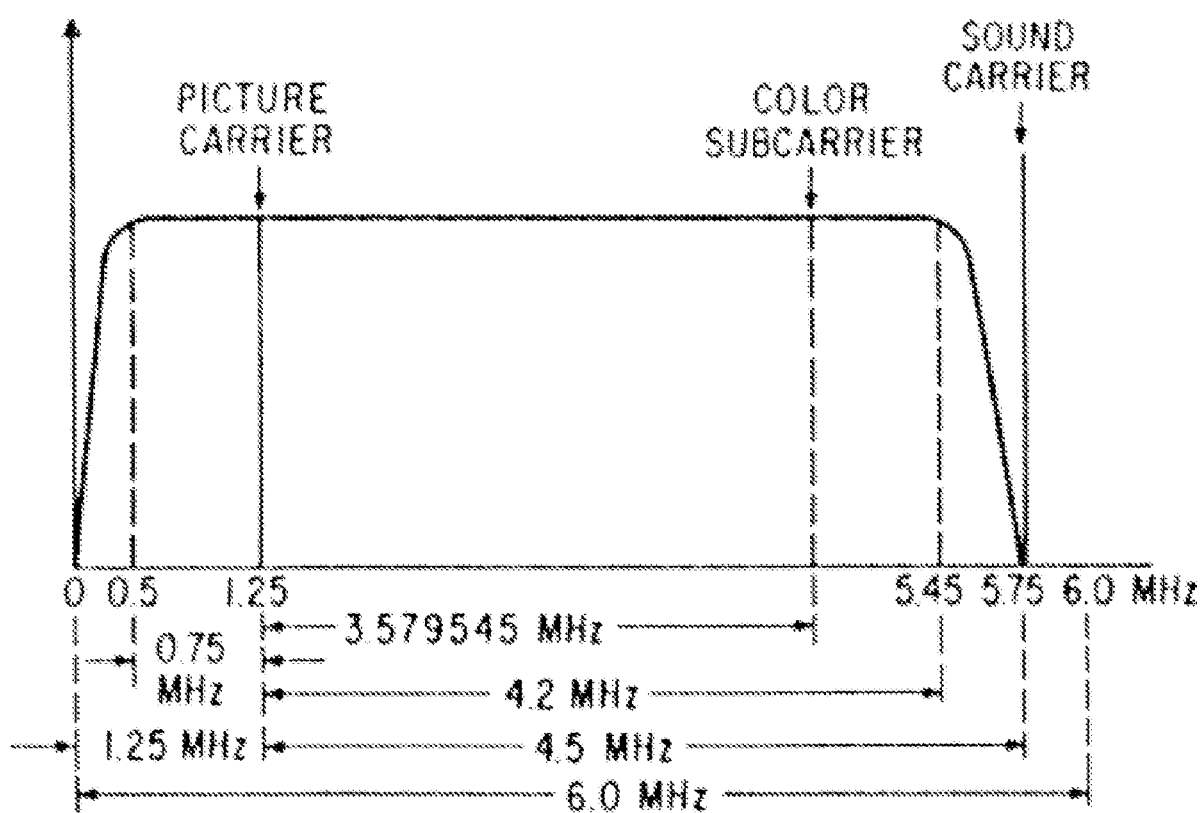
FIG. 3 is a simplified diagram illustrating an NTSC spectrum and various components of the spectrum.

To be able to sense incumbent users, it is often crucial to understand the signals used by the incumbent users. FIG. 3 is a simplified diagram illustrating an NTSC spectrum and various components of the spectrum. This diagram is merely an example, which should not unduly limit the scope of the claims. One of ordinary skill in the art would recognize many variations, alternatives, and modifications. As shown in FIG. 3, an NTSC spectrum has frequency ranges for picture carrier, color subcarrier, and sound carrier.

Figure 4:
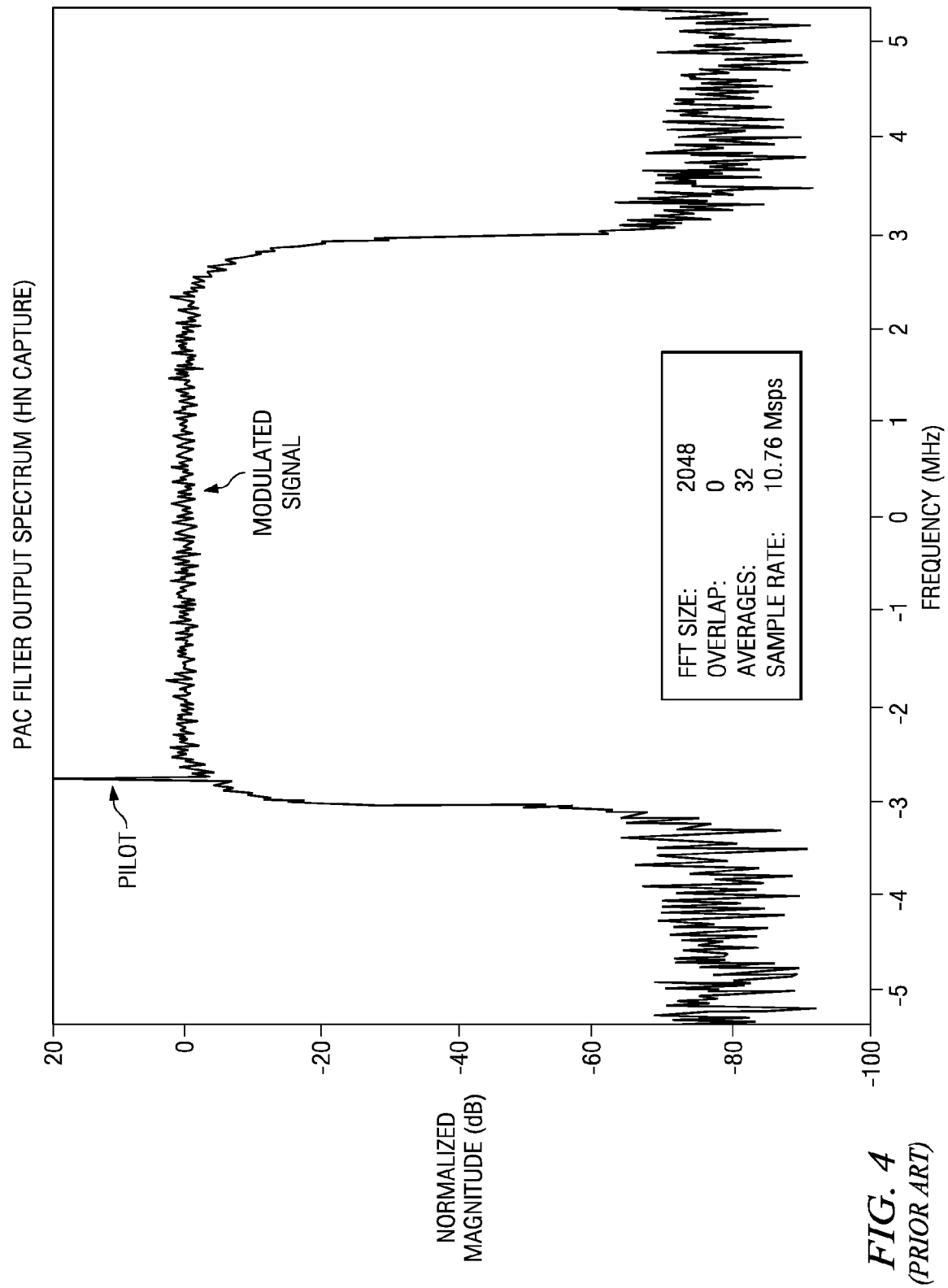
FIG. 4 is a diagram illustrating a DTV spectrum as captured by a spectral analyzer.

FIG. 4 is a diagram illustrating a DTV spectrum as captured by a spectral analyzer. This diagram is merely an example, which should not unduly limit the scope of the claims. One of ordinary skill in the art would recognize many variations, alternatives, and modifications. As can be seen, the DTV spectrum includes a pilot frequency.

In addition to the NTSC and DTV spectra, spectrum for Part 74 devices often needs to be analyzed. As an example, Part 74 devices include microphones. Typically, Part 74 devices have the following characteristics:

Most microphones use analog modulation (FM)
Bandwidth: a maximum of 200 KHz
Power: maximum 250 mW (24 dBm) in UHF band, but usually operated at less than 50 mW. As an example, applying transmit power 10 mW, antenna gain −10 dBi, body absorption 27 dB, and range 100 m, then minimum received power level is −95 dBm.
Required WRAN CPE out-of-band emission level to protect Part 74 devices is 6.2 uV/m (15.8 dBuV/m measured at 3 m in 120 KHz)
Path loss needed between microphone receiver and Licence-Exempt devices beyond 1 m (required D/U=20 dB)

To be able to sense or detect these spectra, various requirements must be satisfied. Typical criteria include, among other things, sensitivity, linearity and wide bandwidth operation, and dynamic range. According to the functional requirements for IEEE802.22 standard, the following items should be measured and controlled;

Scheduled quiet periods
Sensing repetition rate and integration time
Sensing should include capture of signal signature to identify the type of incumbent and other Licence-Exempt signals and possibly the transmit unit identification
Threshold per incumbent type
Incumbent profile identification
WRAN device identification from the received RF signal As an example, the sensing threshold for DTV signals is −116 dBm for total ATSC DTV power in the 6 MHz channel. For analog TV signals the threshold is −94 dBm measured at peak of sync of the NTSC picture carrier. For wireless microphone (Part 74 devices) the threshold is −107 dBm measured in 200 kHz bandwidth.

As explained above, various sensing schemes have been proposed in the past. For example, coarse energy detection sensing technique can be used, but unfortunately it only to detect existence of signals such as received signal strength indication (RSSI). Fine and/or feature detection sensing techniques categorize the signal types to sense the signals. For example, conventional techniques such as fine energy based detection, signal feature detection, and cyclostationary feature detection have been proposed.

The conventional techniques as listed above are useful in various ways. Unfortunately, they are often inadequate and inefficient. Below is an analysis of the conventional system.

One of the popular conventional techniques involves matched filter detection method. Typically, to use this method, a priori knowledge of incumbent signals is needed. For example, it is often necessary to know modulation type and order, pulse shaping, packet format, etc. In addition, the method needs to achieve coherency with incumbent user signals: timing and carrier synchronization, even channel equalization. In various application, the method requires a some time to achieve high processing gain as a result of its coherency characteristics and needs a dedicated receiver for each incumbent class.

Figure 5:
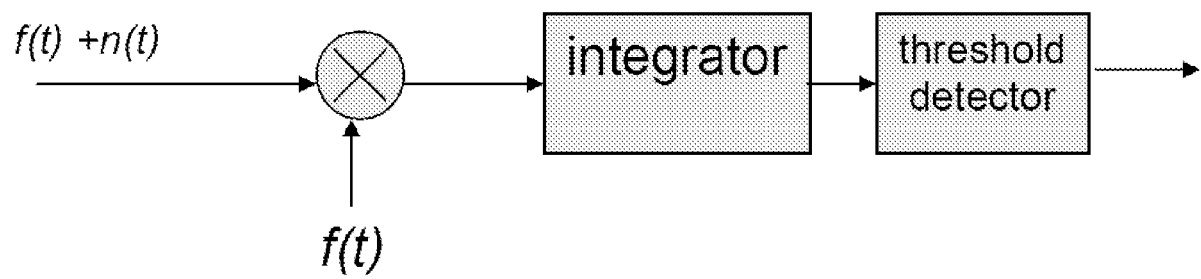
FIG. 5 is a diagram illustrating a system for match filter detection.

FIG. 5 is a diagram illustrating a system for match filter detection.

Figure 6:
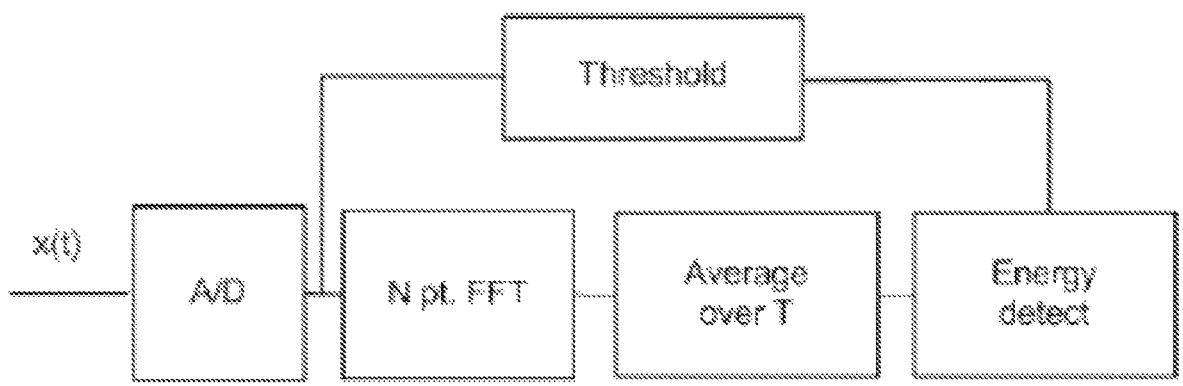
FIG. 6 is a simplified diagram illustrating a system for energy detection method. Energy detection is non-coherent detection.

Another detection technique is energy detection. Typically, energy detection is non-coherent detection. The amount of energy in a given band is measured. One way of this detection is to use fast Fourier transform (FFT) devices and average the outputs over a fixed interval. Since FFT plays an instrumental role in the detection scheme, an increase in FFT size improves frequency resolution and helps narrowband signal detection. In addition, an increase in averaging time reduces the noise power thus improving SNR. To illustrate, FIG. 6 is a simplified diagram illustrating a system for energy detection method. Energy detection is non-coherent detection. The amount of energy in a given band is measured. One possible way of this detection is to use fast Fourier transform (FFT) devices and average the outputs over a fixed interval. For this case, increasing FFT size improves frequency resolution and helps narrowband signal detection. Longer averaging time reduces the noise power thus improving SNR. There are some drawbacks; the threshold is susceptible to unknown or interference signals; energy detector does not differentiate among modulated signals, noise, and interference because it cannot recognize the interference; energy detector does not work for spread spectrum signals. As an example, FIG. 6 provides a implied diagram illustrating the energy detection method using a FFT.

Figure 7:
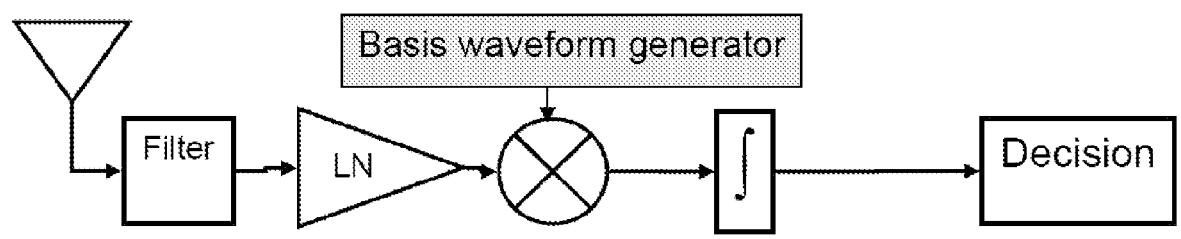
FIG. 7 is a simplified diagram of a wireless communication system that is implemented with an energy detection component.

In a system, the received signal strength within a given bandwidth can usually be detected after the RF receiver. For example, decision can be made by various different ways such as analog/digital integration. Full range of spectrum profile can be obtained quickly with low power consumption. Integration time and threshold are important. For example, a control station can be used to set various parameters as constant values. FIG. 7 is a simplified diagram of a wireless communication system that is implemented with an energy detection component.

Unfortunately, there are various drawbacks associated with the energy detection method. Among other things, the threshold is susceptible to unknown or interference signals. In addition, energy detector does not differentiate among modulated signals, noise, and interference, as it cannot recognize the interference. Also, energy detector method often does not work for spread spectrum signals.

Figure 8:
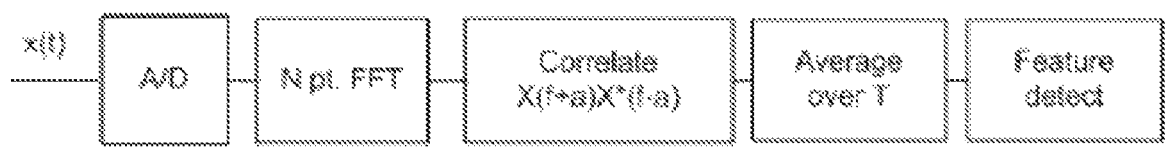
FIG. 8 is a simplified diagram illustrating a cyclostationary system for detecting incumbent signals.

Another conventional method for sensing incumbent wireless channels is the cyclostationary feature detection method. FIG. 8 is a simplified diagram illustrating a cyclostationary system for detecting incumbent signals. The cyclostationary feature detection method utilizes built-in periodicity of signals that is cyclostationary (due to their statistics), mean, and autocorrelation-exhibit periodicity. For example, cyclostationary signals exhibit correlation between widely separated spectral components due to spectral redundancy caused by periodicity. Spectral correlation function (SCF) is defined as cyclic spectrum (CSD). SCF is two a dimensional transform function in general complex valued and the parameter is called cycle frequency (CF). Different types of modulated signals can have highly distinct spectral correlation functions. For example, stationary noise and interference exhibit no spectral correlation. In contrast, detected features are number of signals, their modulation types, symbol rates, and presence of interferers. Usually, the SCF is preserved even in low signal-to-noise ration while energy detector is limited by the large noise.

Using underlying periodicities in the signal structure, cyclostionarity with a period P is observed if autocorrelation function is periodic with period P. For example, cycle frequency is an integer multiple of the fundamental time period of the signal. If CF is equal to 0, CAF is equal to conventional autocorrelation and CSF=PSD. SCF typically has symmetry and periodicity: SCF is specified over $\{0<f<\frac{1}{2}, 0<CF<1-2f\}$. If CF is known for a specific signal among signals superposed, SCF can be extracted. FIG. 7 is a simplified diagram illustrating a system for cyclostationary feature detection.

The cyclostationary feature detection method is useful in various ways. Unfortunately, there are various disadvantages as well. For example, complicated processing of signals is needed, thereby making speed sensing application difficult to obtain. In addition, a priori knowledge of target signal characteristics needed. As a result, the method cannot be applied for unknown signals. Moreover, at one time, only one signal can be detected. For multiple signal detection application, multiple detectors have to be implemented or a slow detection speed is used.

Therefore, it is to be appreciated that the present invention provides a novel and efficient system and method for sensing incumbent signals.

As explained above, after the DTV transition, VHF low band has Channels 2-6 in the frequency band of 54-88 MHz, VHF high band has Channels 7-13 in the frequency band of 174-216 MHz, and UHF band has Channels 14-51 in the frequency band of 470-698 MHz. As described in the related application, n consecutive bands in VHF high or UHF band can be selected for WRAN services. The whole band of n bands is divided into n*1 subbands, where each band has 1 subbands and each subband has 6000/1 KHz bandwidth (e.g., the United States use 6 MHz TV band). According to an embodiment, at the receiving end, TV signals are received by a receiver and then down conversion performed. The down converted signals are then feed to an 1*n point FFT device. By comparing FFT output signals with information stored in the memory of the receiver, currently operated incumbent users can be identified and categorized (e.g., NTSC, DTV, and/or Part 74 devices). In a specific embodiment, all incumbent signals throughout the whole band (n TV bands) can be detected simultaneously. Periodically any communication equipment including all consumer premise equipments (CPEs) and base stations of the wireless communication systems can do this sensing to update the list of active incumbent users. For example, if n is equal to 1, this sensing is performed for only one band. In a TV signal sensing scenario, the sensing is done for only one TV channel band.

Figure 9:
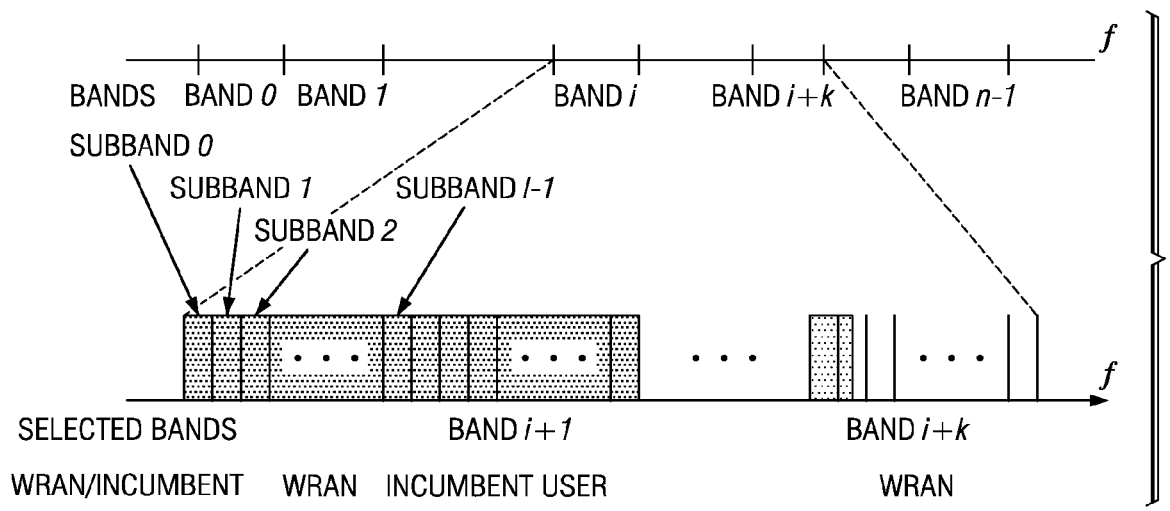
FIG. 9 is a simplified diagram illustrating frequency bands components according to an embodiment of the present invention.

FIG. 9 is a simplified diagram illustrating frequency bands components according to an embodiment of the present invention. This diagram is merely an example, which should not unduly limit the scope of the claims. One of ordinary skill in the art would recognize many variations, alternatives, and modifications. As shown, k consecutive bands are selected out of n bands. Each band has 1 subband. Each subband has one frequency component.

According to an embodiment, only spectral components are used to extract information on incumbent user signals from the received signals. For various sensing applications according to the present invention, domain components are not needed, and therefore no time domain analysis is executed for this type of sensing. It is to be appreciated the use of spectral components according to the present invention allows better reliability and efficiency, as the sensing and detection is less likely to be susceptible to various parameters associated with TV band tuners, such as phase noise, etc.

Figure 10:
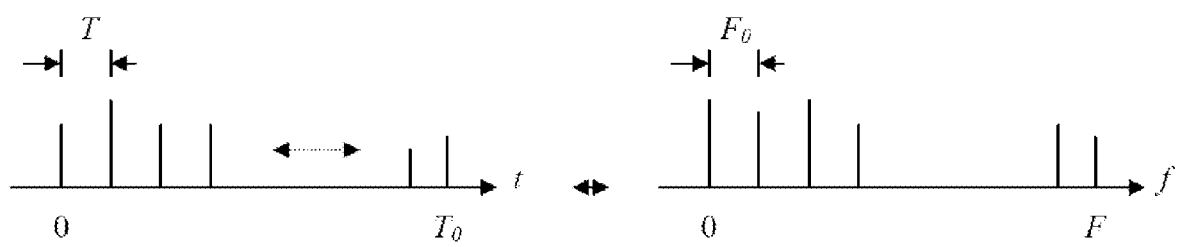
FIG. 10 is a simplified diagram illustrating a transform of signals for sensing according to an embodiment of the present invention.

According to an embodiment, the present invention provides a system where received signals are converted by the receivers and outputted as a form of FFT outputs. For example, all or part of these spectral components can be utilized for the sensing application. For example, FIG. 10 is a simplified diagram illustrating a transform of signals for sensing according to an embodiment of the present invention. This diagram is merely an example, which should not unduly limit the scope of the claims. One of ordinary skill in the art would recognize many variations, alternatives, and modifications.

According to the embodiments, with one measurement for one symbol duration, all frequency components can be obtained. This means essentially the entire frequency band can be sense for one symbol duration. In certain embodiments, for better sensing performance, the measured components are averaged for more than one symbol duration. For that case, sensing can take place for the duration of a few symbols. For example, for OFDM systems, the duration is a few OFDM symbols.

As discussed above, correlation detection method according to the embodiment of the present invention is different from energy detection method, which involves measuring the amount of energy of the received signal. However, it is to be appreciated that techniques according to the present invention implemented in conjunction with energy detection method. For example, all frequency components are summed up, which provides the total energy for the received signal.

Correlation detection method according to the present invention measures the correlation between spectral signatures of the received signals and pre-stored signature information on various types of incumbent user signals. As an example, the information for various incumbent signal types is prestored. In addition, cross correlation can be calculated mathematically for the correlation.

Figure 11:
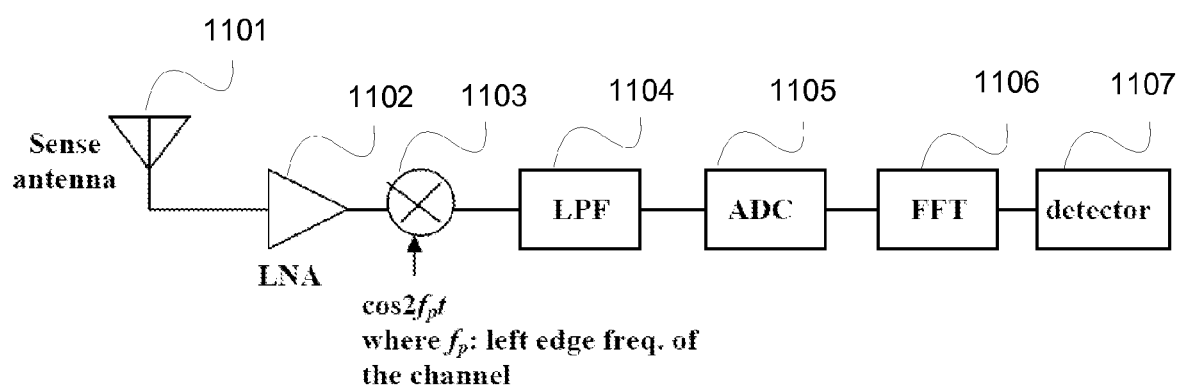
FIG. 11 is a simplified diagram illustrating a system for detecting available frequency channels for wireless communication according to an embodiment of the present invention.

FIG. 11 is a simplified diagram illustrating a system for detecting available frequency channels for wireless communication according to an embodiment of the present invention. This diagram is merely an example, which should not unduly limit the scope of the claims. One of ordinary skill in the art would recognize many variations, alternatives, and modifications.

As shown in FIG. 11, a system 1100 for determining availability of wireless communication links. The system including the following components:
1. an antenna 1101;
2. a low-noise amplifier 1102;
3. a frequency modifier 1103;
4. a low-pass filter 1104;
5. an analog-to-digital converter 1105;
6. a fast Fourier transformer 1106; and
7. a detector 1107.

The antenna 1101 is used for wirelessly receiving analog signals. For example, the analog signals may be modulated NTSC, DTV signals, and/or Part 74 microphone signals. According to certain embodiments, the analog signals are transmitted over the air and may include signals from different frequency ranges. For example, even if the system 1100 is to detect channel availability at a certain frequency ranges, other frequency ranges may nevertheless be received by the antenna. As explained above, the analog signals may include symbols that are module in time-domain. In certain embodiments, one set of symbols at a given time is used for the purpose of channel detection. According to a specific embodiment, two or more sets for symbols are averaged at different time frame, and the average is used for channel detection.

The low-noise amplifier (LNA) 1102 is used to enhance reception of the analog signals. According to an embodiment, the LNA 1102 is located close to the antenna 1101. For example, the LNA 1102 reduces noises of received signal and boost desired signal power. Depending on the application, the LNA 1102 may be implemented using various types of devices. For example, the LNA 1102 can be implemented using JFET and/or HEMT. In certain applications, distributed amplifiers and/or other types of devices may be used to implement the LNA.

The frequency modifier 1103 is used to provide a frequency shift. In a specific embodiment, the system 1100 is to detect channel availability for signals at a predetermined offset. For example, the received analog signals are modulated at a specific frequency offset. To determine various characteristics of the analog signals associated with a particular frequency range, it is often necessary to first shift the analog signals to a proper frequency range. In a specific embodiment, the frequency is shifted according using the following formula:

$f = \cos 2f_p t$, wherein f is the resulting frequency, and $f_p$ represents the lowest frequency of a specific frequency band.

Depending on the application, the receive signals may be shifting using other methods. For example, for applications involving sensing multiple frequency bands, it may be necessary shift more than one frequency band at a time.

The low-pass filter (LPF) 1104 is used to filter out unwanted signals. According to various embodiments, the LPF 1104 filters out signals that are not associated with a selected frequency range that is to be detected. As an example, the LPF 1104 is implemented with circuitries to cut off frequencies above 6 MHz, thereby providing a spectrum of 6 MHz for channel detection.

The analog-to-digital converter (ADC) 1105 is used to convert the received analog signal to digital signals. According to embodiments, the ADC provides digital signals that allow easy processing by the system 1100. Depending on the specific application, various embodiments of the present invention also detect channel availability based on analog signals.

The fast Fourier transformer (FFT) 1106 is provided to transform signals from time domain to frequency domain. For example, the operation of the FFT 1106 is illustrated according to FIG. 10. In various embodiments, the determination of channel availability is based on a correlation method, and only frequency domain information is used.

The detector 1107 is provided to determine channel availability based on the signals in frequency domain. As explained above, a correlation method is used. The detector 1107 is configured to determine a plurality of signal strength levels. For example, in a 6 MHz wide frequency band, there may hundreds of signal strength levels at different frequencies. As an example, there can be 200 frequency components for the 6 MHz wide frequency band. The detector 1107 uses the signal strength level information at certain frequencies (e.g., predetermined frequencies where references strength levels are available).

Figure 13:
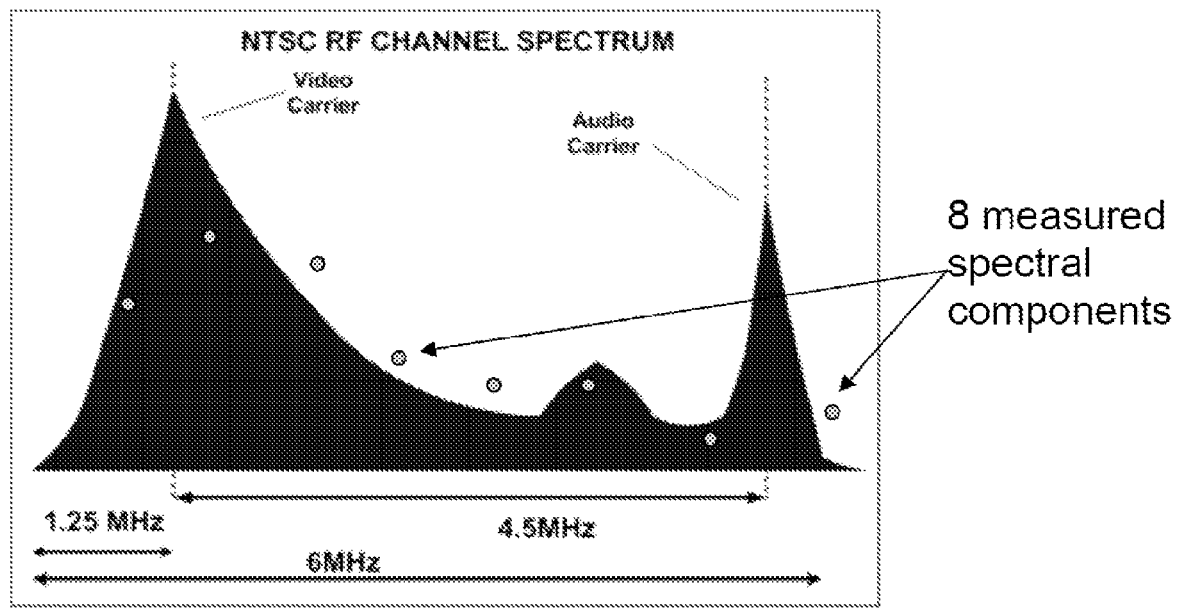
FIG. 13 is a simplified diagram illustrating spectral components selected for the sensing channel availability.

In a specific embodiment, five frequency component components, $F_{50}$, $F_{103}$, $F_{200}$, $F_{417}$, and $F_{1200}$ are selected for determining the channel availability, where $F_n$ is the nth frequency component of the band. FIG. 13 is a simplified diagram illustrating spectral components selected for the sensing channel availability. This diagram is merely an example, which should not unduly limit the scope of the claims. One of ordinary skill in the art would recognize many variations, alternatives, and modifications. As shown in FIG. 13, eight bands are selected as various points. Depending on the specific application, fewer or more bands may be selected.

According to a specific embodiment, a correlation detection method is used. For example, the detector 1107 compares the shape of spectrum of the received signal with the well-known shapes of possible incumbent signals. More specifically, mathematical correlations for a fixed number of frequency components with pre-stored values for NTSC and/or DTV signals are compared. In a specific embodiment, if signal strength level for one of the component is larger than the reference value at the corresponding frequency, detector 1107 determines that an NTSC and/or DTV signal exist. As an example, target frequency components for correlation calculation are predetermined depending on the type of incumbent signals and required sensing performance.

According to another embodiment, the detector 1107 determines channel availability based on the existence of pilot signals. For example, to determine whether a pilot signal exists for a specific television frequency band, the ratio of pilot component (i.e., signals at a specific frequency) to another component is calculated. For the example in the above, if the ratio of $F_{417}/F_{1200}$ of a spectrum is greater than $th_n$, this signal determined to be an NTSC signal where $th_n$ is the predetermined threshold for NTSC signals. On the other hand, if $F_{103}/F_{1200} > th_d$, this signal is DTV where $th_d$ is the predetermined threshold for DTV signals.

It is to be understood that embodiments of the present invention are flexibly implemented. For example, fewer or more components may be selected for sensing applications. In addition, frequency component values can be averaged over several symbol periods to have better sensing results. In a specific embodiment, both the detector 1107 uses both the correlation method and pilot method. For example, the result from each method is assigned a weight. The determination is based on the weighted sum from the result of two methods.

As mentioned above, embodiments of the present invention may be applied to Part 74 devices as well. In a specific embodiment, signals from Part 74 devices are detecting using a FFT devices and a detector similar to detector 1107. As an example, for every 3 KHz in a 6 MHz band, a spectral component is measured and compared with other components. To do that, the correlation and/or the pilot method are applied. For example, if considerable components in a 200 KHz band exist, the detector concludes that a wireless microphone is operated in that band. On the other hand, if consecutive six components spaced equally in 200 KHz have considerable amount of energy, the detector would conclude that one or more microphone signals are present. For example, if more correlation with stored information on various microphone signal spectral signatures than predetermined value exists, a wireless microphone is operated in that band.

Figure 12:
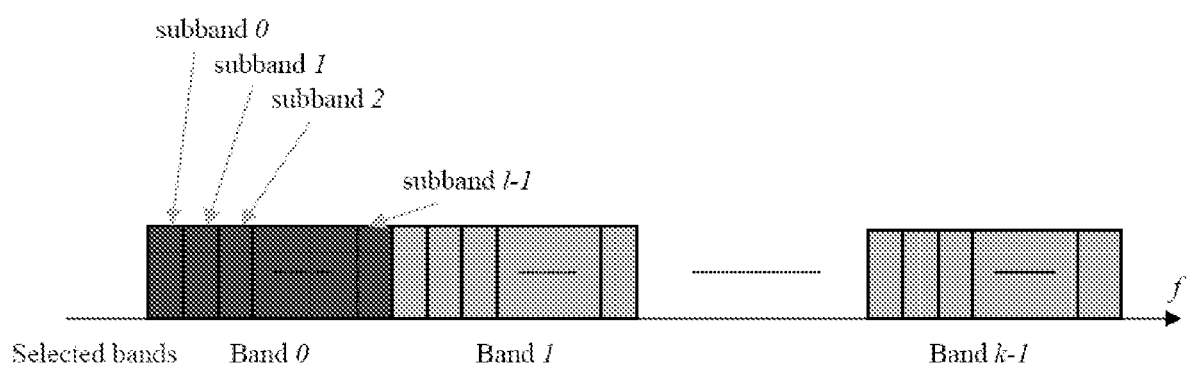
FIG. 12 is simplified diagram illustrating a breakdown of frequency spectrum according to an embodiment of the present invention.

In certain applications, it is desirable to detect multiple frequency bands in a single iteration. According to certain embodiments, multiple TV channel bands are covered with one measurement for each type of incumbent user signals. To be able to perform detection for multiple frequency bands, the frequency spectrum is divided into bands and subbands. FIG. 12 is simplified diagram illustrating a breakdown of frequency spectrum according to an embodiment of the present invention. This diagram is merely an example, which should not unduly limit the scope of the claims. One of ordinary skill in the art would recognize many variations, alternatives, and modifications.

As shown, the frequency spectrum is divided into k*l subbands where each TV channel is divided into l subbands. Each subband has one frequency spectral component. The difference between one detecting a single TV channel band and detecting multiple TV channel is that, for multiple TV channel band case every l components is compared with the pre-stored information. To compare multiple TV channel bands, k channel band is selected out of n channel band. Each channel band is divided into l subbands. For each type of incumbent user signal, the following procedure according to embodiments of the present invention is applied to sense the signals.

In a specific embodiment, a method is used for detecting NTSC signals. After down conversion with (fp+1.25) MHz, where fp is the frequency of the left edge of the lowest TV band, frequency shift, the received signal is inputted to an l*n point FFT device. Then the FFT outputs are compared with reference levels in a correlation method. Depending on the signals that are being compared, two or more frequency band can be detected.

In another embodiment, a method is used for detecting DTV signals. After down conversion with (fp+0.30944) MHz frequency shift, the received signal is inputted to an l*n point FFT device. For example, comparing the FFT outputs is performed using correlation and/or pilot methods as described above. Based on the result of these methods, a detector determines whether an incumbent signal exists or which type of an incumbent user signal is detected in each TV band where fp is the frequency of the left edge of the lowest TV band. Typically, that 0.30944 MHz is the pilot signal frequency for DTV signals above the left edge of a TV band.

In yet another embodiment, a method is used for detecting signals from Part 74 devices. After down conversion with fp MHz frequency shift, the received signal is inputted to an l*n point FFT device. For example, comparing the FFT outputs is performed using the correlation method. For example, if some consecutive strong components in 200 KHz, then it is likely that one or more Part 74 devices are operating.

Figure 14:
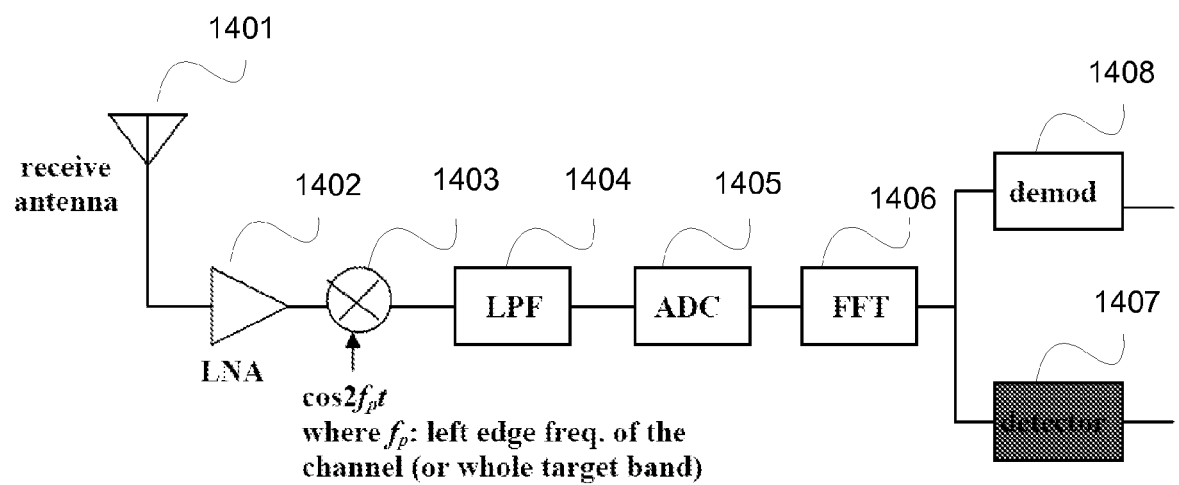
FIG. 14 is a simplified diagram illustrating a WRAN system according to an embodiment of the present invention.

It is to be appreciated that various embodiments of the present invention may be flexibly implemented with existing systems. For example, the sensing system as shown in FIG. 11 may be implemented as a part of a wireless communication system, such as a WRAN communication system. FIG. 14 is a simplified diagram illustrating a WRAN system according to an embodiment of the present invention. This diagram is merely an example, which should not unduly limit the scope of the claims. One of ordinary skill in the art would recognize many variations, alternatives, and modifications.

As shown in FIG. 14, a WRAN system 1400 includes the following components:
 1. an antenna 1401;
 2. a low-noise amplifier 1402;
 3. a frequency modifier 1403;
 4. a low-pass filter 1404;
 5. an analog-to-digital converter 1405;
 6. a fast Fourier transformer 1406;
 7. a detector 1407; and
 8. a demodulator 1408.

The system 1400 is configured for both demodulating and sensing signals. Analog signals transmitted over the air is received by the antenna 1401 and processed by the LNA 1402, the frequency modifier 1403, the LPF 1404, the ADC 1405, and the FFT 1406. The detector 1407 uses the processed signal, using the correlation and/or the pilot method as described above, to determine availability of wireless frequency bands. In addition, the detector 1407 stores information related to possible incumbent user signals.

The signal receiving and processing components, which include the antenna 1401, the LNA 1402, the frequency modifier 1403, the LPF 1404, the ADC 1405, and the FFT 1406, are also used for providing signals for data transmission. The demodulator 1408 demodulates the received data signals for use in data transmission.

According to various embodiments, the system 1400 includes other components. In a specific embodiment, the system 1400 includes a controller for operating the demodulator and the detector. For example, the controller causes the demodulator to demodulate data at a certain frequency band based on a determination of frequency availability by the detector. As another example, the controller determines the channel detection method used by the detector. For example, the detector uses correlation method to compare multiple frequency components to obtain a relatively more precise result. On the other hand, the detector may use the pilot method for relatively faster results.

In a specific embodiment, the system 1400 can select a number of frequency bands as potential bands, detect the frequency availability of these bands, and select the available bands for data transmission. As an example, for n=32, k=4, l=60, four bands of 6 MHz bandwidth each are selected out of thirty two bands assigned for a wireless communication system. Each band is divided into 60 subbands and each subband has 100 KHz bandwidth. The FFT uses the following parameters:

Frequency separation F0=100 KHz
Symbol duration T0=1/100 KHz=10 us
Sampling rate F=6×32=192 MHz
Sampling interval T=1/F=1/192 us
No. of samples in a symbol duration N=T0/T=1920
2048 point FFT/IFFT can be used As an example, the system can dynamically select any four consecutive bands out of 32 bands. In addition, the system can also expand the sensing band in these four bands.

Figure 15:
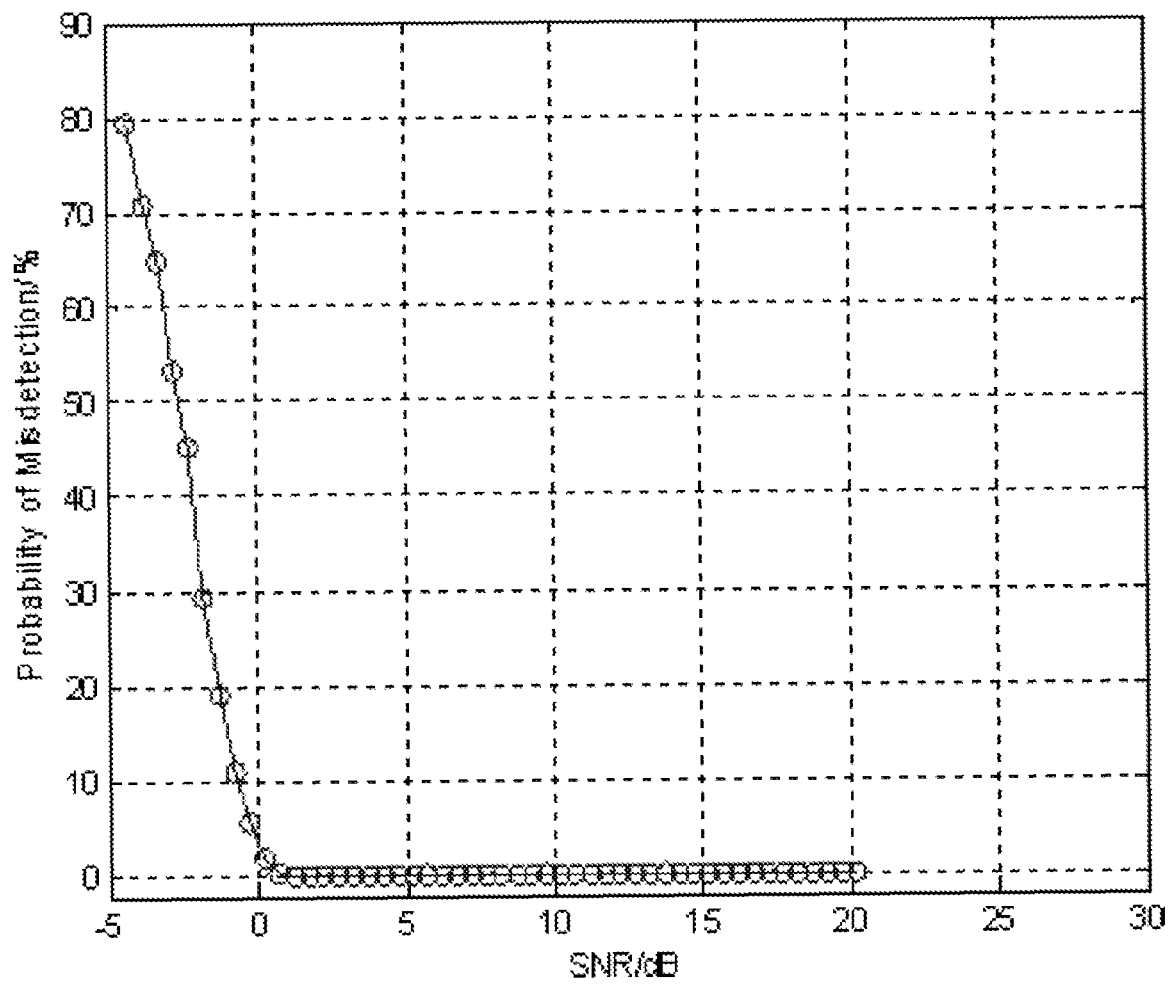
FIG. 15 is simplified diagram illustrating a probably of midsection based on signal-noise-ratios.

To further illustrate operation of various embodiments, simulation results for probability of misdetection are provided. FIG. 15 is simplified diagram illustrating a probably of midsection based on signal-noise-ratios. This diagram is merely an example, which should not unduly limit the scope of the claims. One of ordinary skill in the art would recognize many variations, alternatives, and modifications. For lower signal-to-noise ratios (SNRs), it is usually more likely to have misdetections. This is because for lower SNRs, smaller correlation values are obtained. For example, a threshold value to judge the existence of signals is set for the scheme. For lower SNRs, the correlation values are often less than this threshold. The performance depends on the number of frequency components used to compare the signals or calculate correlations. As the number of frequency components increases, the probabilities of misdetection decreases. In this exemplary simulation, only 21 points (or frequency components) are taken which is less than the number practically applied in a real implementation.

Figure 16:
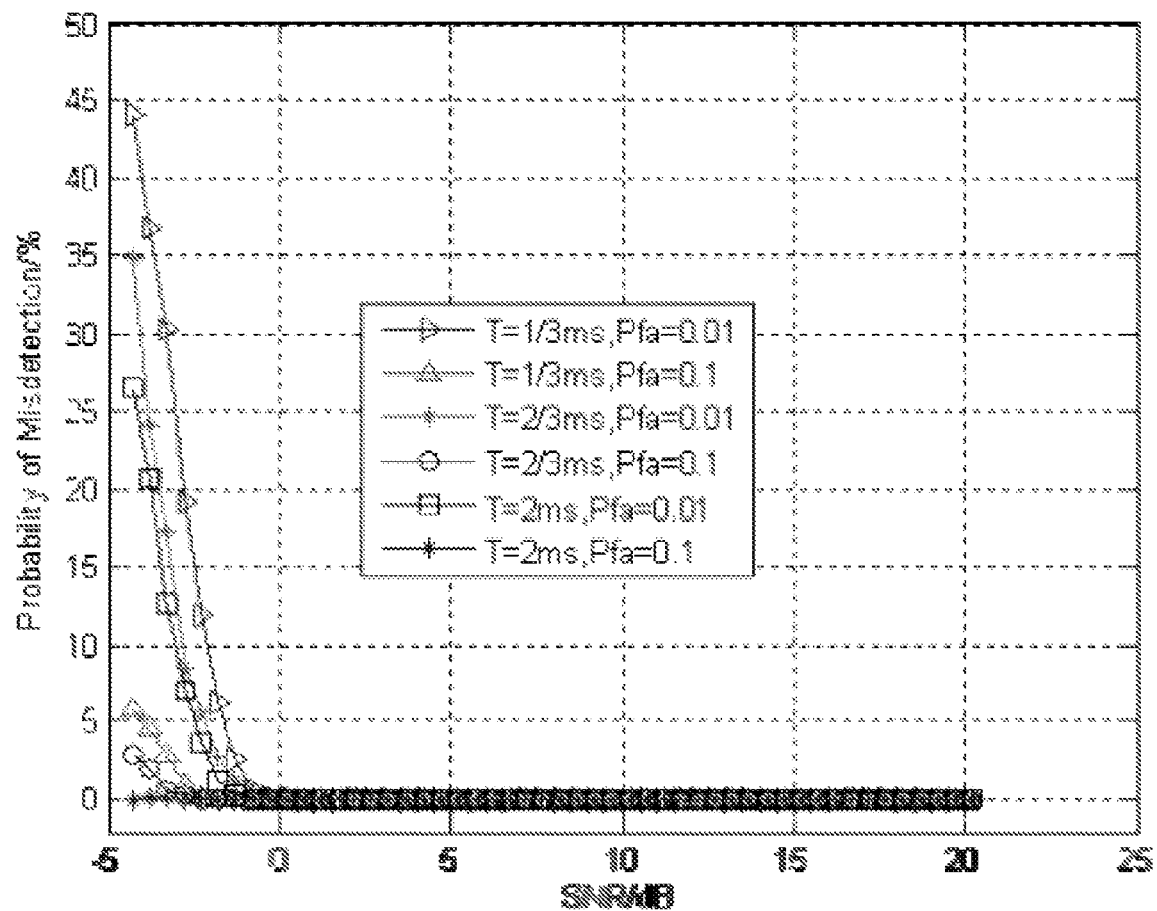
FIG. 16 is a simplified diagram illustrating detection accuracy in relationship with sensing time according to an embodiment of the present invention.

Sensing time also affect the accuracy of various detection techniques according to the present invention. FIG. 16 is a simplified diagram illustrating detection accuracy in relationship with sensing time according to an embodiment of the present invention. This diagram is merely an example, which should not unduly limit the scope of the claims. One of ordinary skill in the art would recognize many variations, alternatives, and modifications.

As shown, the amount of sensing times affects the sensing performance. For example, when sensing is performed over a long time, good performance is often achieved. However, it is to be appreciated that various detection techniques according to the present invention have advantages over conventional techniques. Among other things, to achieve the same level of accuracy, embodiments of the present invention uses less time when compared to convention systems.

Figure 17:
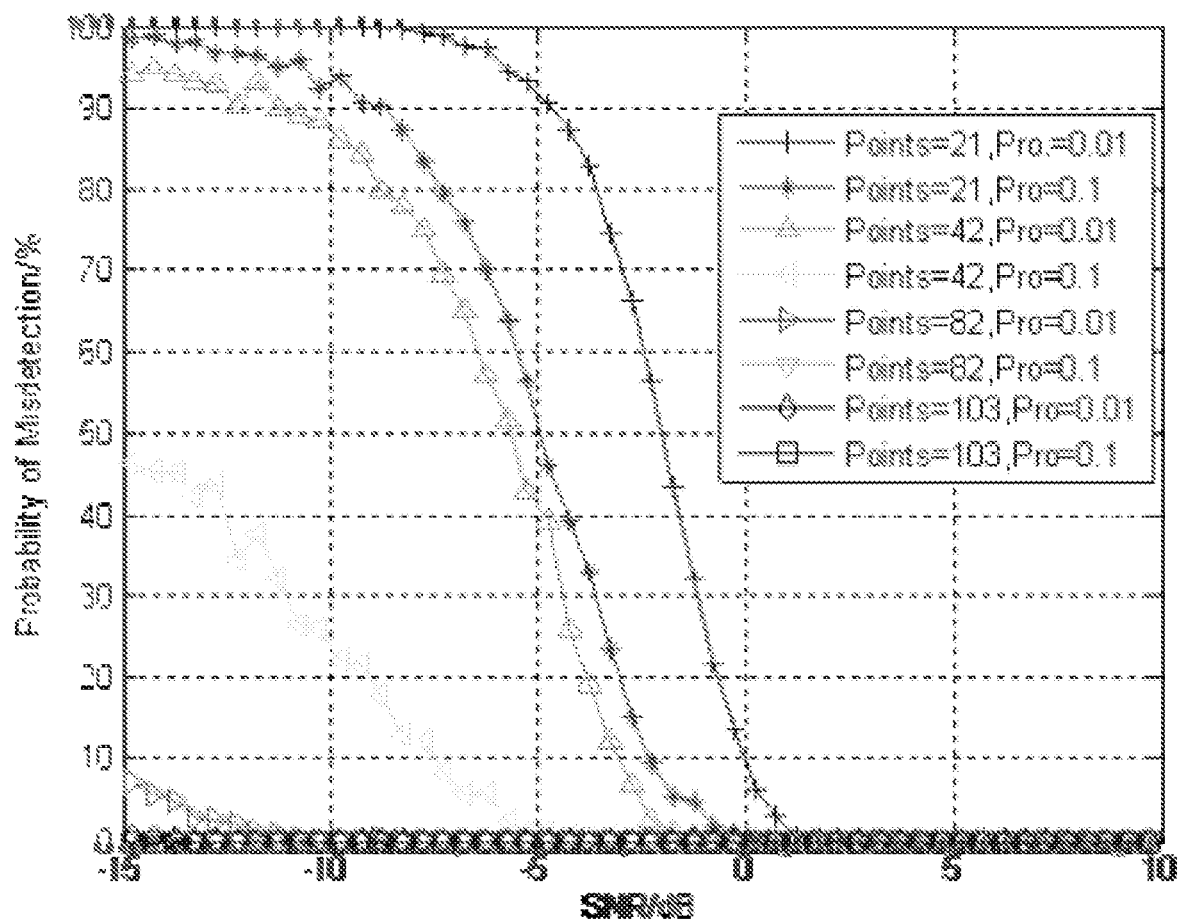
FIGS. 17 and 18 are simplified diagrams illustrating detection accuracy in relationship with the sensing time according to an embodiment of the present invention.
Figure 18:
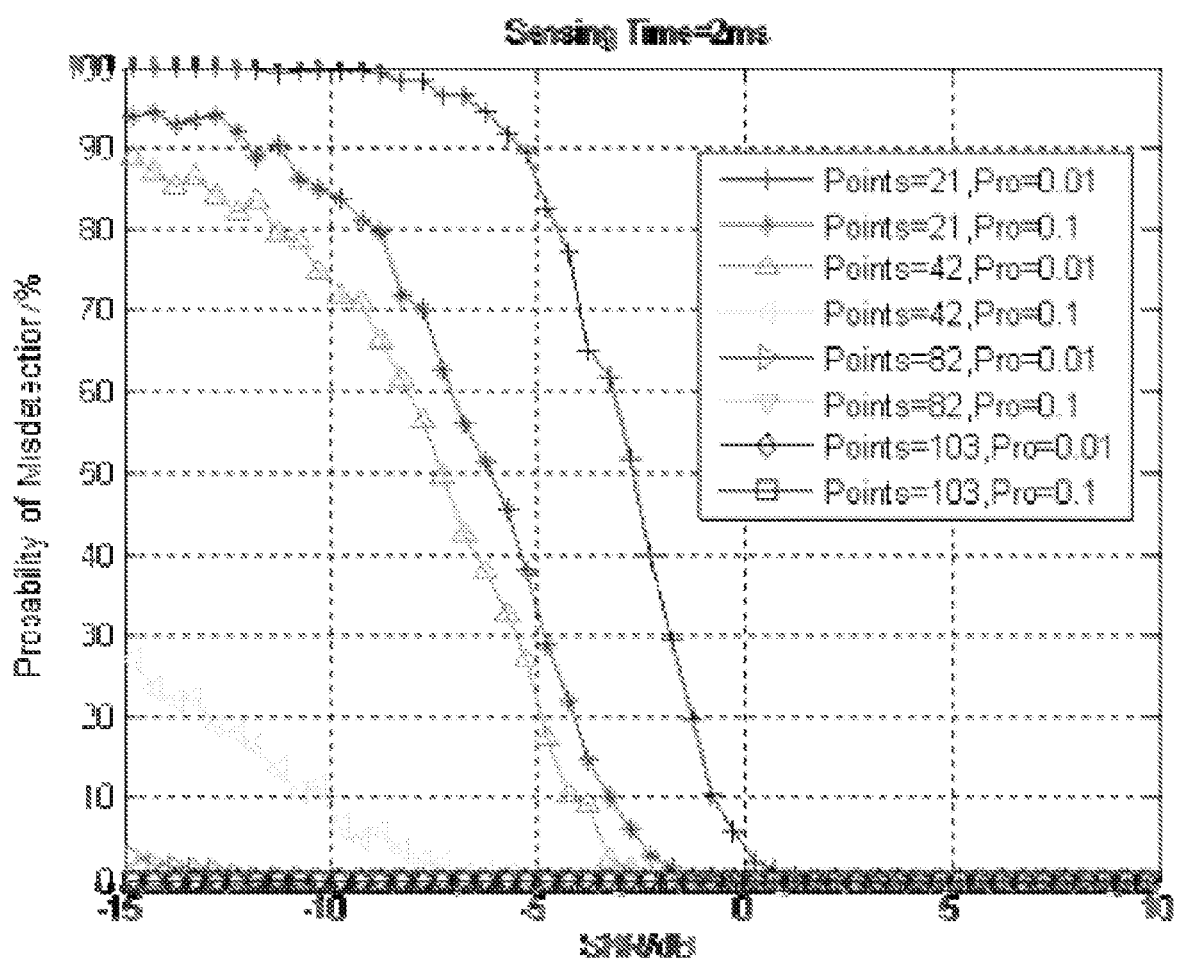

The number of frequency components used for frequency channel detection also is another factor related to detection accuracy. FIGS. 17 and 18 are simplified diagrams illustrating detection accuracy in relationship with the sensing time according to an embodiment of the present invention. This diagram is merely an example, which should not unduly limit the scope of the claims. One of ordinary skill in the art would recognize many variations, alternatives, and modifications. More specifically, FIG. 17 illustrates simulation result for probability of misdetection at various signal to noise ratios for different numbers of frequency components for sensing time of ⅓ ms. FIG. 18 illustrates simulation result for probability of misdetection at various signal to noise ratios for different numbers of frequency components for sensing time of 2 ms.

Figure 19:
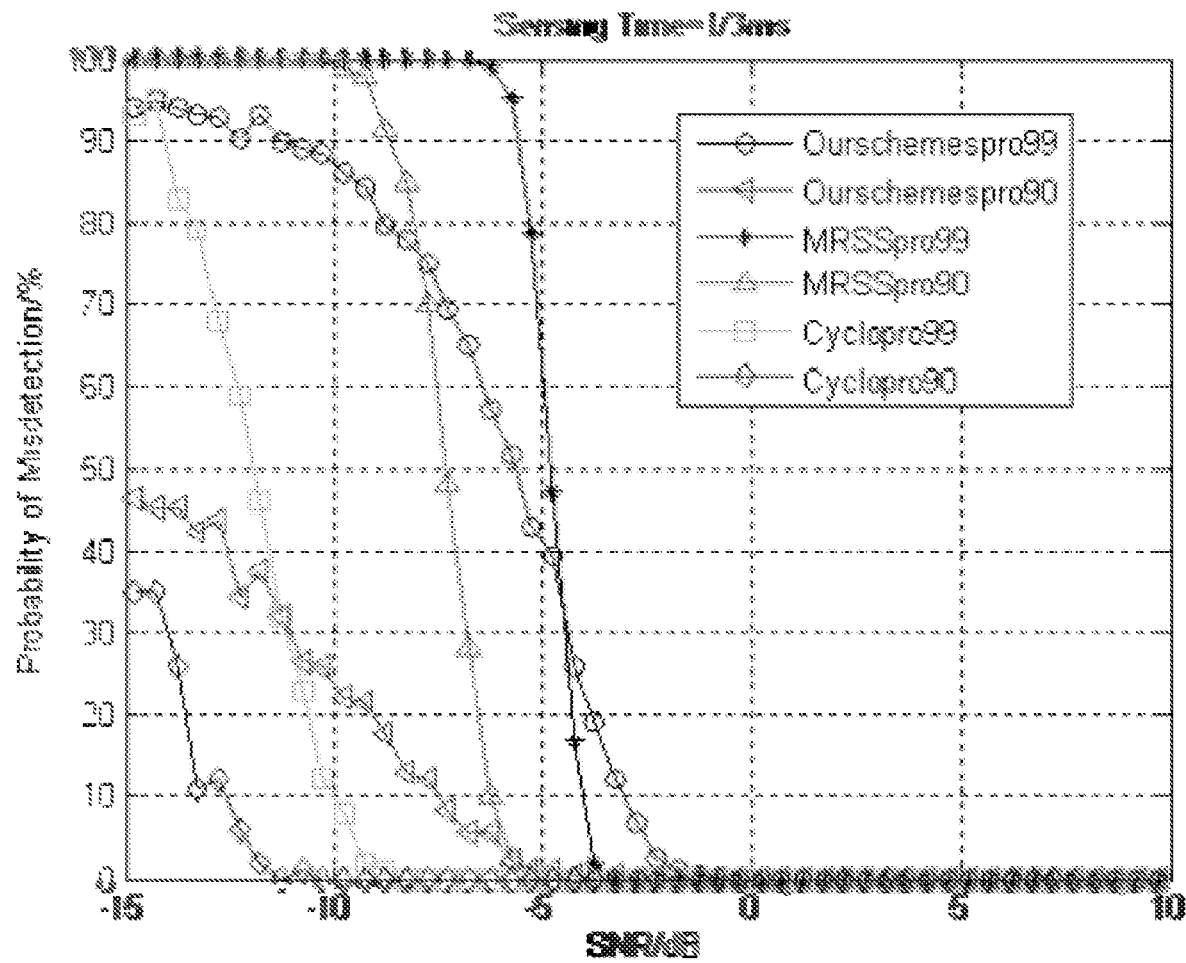
FIGS. 19 and 20 are simplified diagrams illustrating detection accuracy in relationship with the number of frequency components according to an embodiment of the present invention.
Figure 20:
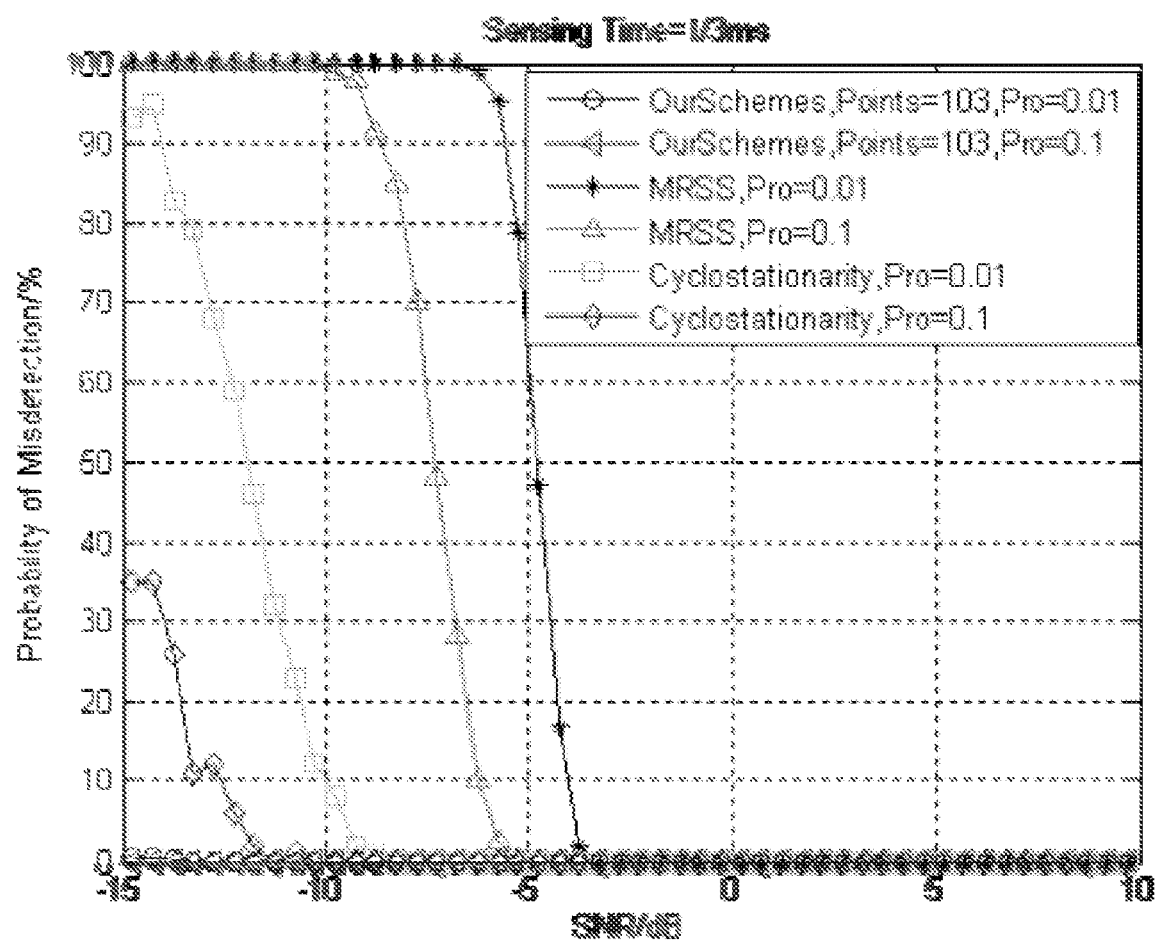

Typically, the higher number of frequency components used in the determination process produces a lower chance of misdetection. FIGS. 19 and 20 are simplified diagrams illustrating detection accuracy in relationship with the number of frequency components according to an embodiment of the present invention. This diagram is merely an example, which should not unduly limit the scope of the claims. One of ordinary skill in the art would recognize many variations, alternatives, and modifications. More specifically, FIG. 19 illustrates simulation result for probability of misdetection at various signal to noise ratios for a detection using 42 frequency components. FIG. 18 illustrates simulation result for probability of misdetection at various signal to noise ratios for a detection using 103 frequency components.

According to an embodiment, the present invention provides a method of determining band availability for a WRAN. The method includes receiving wirelessly analog signals within a predetermined range of frequencies. The method also includes converting the analog signals to digital signals. The digital signals are characterized in a frequency domain. The method additionally includes determining a plurality of signal strength levels associated with the digital signals at a plurality of frequencies. Furthermore, the method includes comparing the plurality of signal strength levels to reference levels at the plurality of frequencies. Moreover, the method includes determining band availability for wireless communication at the predetermined range of frequencies. For example, the embodiment is illustrated according to FIG. 12.

According to yet another embodiment, the present invention provides a system for determining availability of wireless communication links. The system includes an antenna for wirelessly receiving analog signals. The analog signals are within a predetermined range of frequencies. In addition, the analog signals are associated with a time-domain. The system further includes a converting component for converting the analog signals to a first plurality of digital signals. The first plurality of digital signals is associated with a time domain at a predetermined range of frequencies. The system additionally includes a transforming component for providing a second plurality of digital signals. The second plurality of digital signals is associated with a frequency domain. Also, the system includes a detecting component for determining wireless channel availability. The detecting component is configured to determine a plurality of signal strength levels associated with the second plurality of digital signals at a plurality of frequencies. The detecting component is further configured to compare the plurality of signal strength levels to reference levels at the plurality of frequencies and to determine band availability for wireless communication at the predetermined range of frequencies based on the comparing. For example, the embodiment is illustrated according to FIG. 14.

According to yet another embodiment, the present invention provides a method for determining availability of wireless communication links. The method includes receiving wirelessly analog signals within a predetermined range of frequencies. The analog signals are associated with a time-domain. The method further includes converting the analog signals to digital signals. The digital signals are characterized in a frequency domain. The digital signals include a first pilot signal and a second pilot signal. The method also includes determining a ratio of signal strength between the first pilot signal and the second pilot signal. The method additionally includes comparing the ratio to a predetermined threshold. Furthermore, the method includes determining band availability for wireless communication at the predetermined range of frequencies based on the comparing. For example, the embodiment is illustrated according to FIG. 12.

According to yet another embodiment, the present invention provides a method for determining availability of wireless communication links. The method includes receiving wirelessly analog signals within a predetermined range of frequencies. The analog signals are associated with a time-domain. The method also includes converting the analog signals to digital signals. The digital signals are characterized in a frequency domain. Also, the digital signals include a first pilot signal and a second pilot signal. The method also includes determining a ratio of signal strength between the first pilot signal and the second pilot signal. The method additionally includes comparing the ratio to a predetermined threshold. Furthermore, the method includes determining a plurality of signal strength levels associated with the digital signals at a plurality of frequencies. Moreover, the method includes determining a first band availability metric for wireless communication at the predetermined range of frequencies based on the comparing the ratio. The method also includes comparing the plurality of signal strength levels to reference levels at the plurality of frequencies. In addition, the method includes determining a second band availability metric for wireless communication at the predetermined range of frequencies based on the comparing the plurality of signal strength levels. Further, the method includes determining a third band availability metric based on the first and second band availability metrics. For example, the embodiment is illustrated according to FIG. 12.

Various embodiments of the present invention provide many advantages over conventional techniques. Among other things, various embodiments of the present invention are implemented in conjunction with existing systems. In a specific embodiment, a technique for determining available frequency bands is implemented on an integrated WRAN system, which both detects and utilizes available frequency bands. For example, certain embodiments of the present invention are compatible with IEEE 802.22 standard. In addition, various techniques according to the present invention are useful for different types of application in the communication network. For example, embodiments of the present invention are useful in detecting incumbent NTSC, DTV, Part 74, and/ or other types of signals. Furthermore, in comparison to conventional techniques, embodiments of the present invention are more efficient and reliable. For example, frequency channel detection can be performed using just one set of symbols. There are other advantages as well.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of determining band availability for a WRAN network comprising:
    simultaneously receiving wirelessly analog signals within a predetermined range of frequencies, the predetermined range of frequencies comprising a plurality of frequencies;
    modifying the analog signals to provide digital signals, the digital signals, the digital signals being characterized in a frequency domain;
    determining a plurality of signal spectral amplitudes of the digital signals, each of the plurality of signal spectral amplitudes associated with a different frequency of the plurality of frequencies, wherein determining the plurality of signal spectral amplitudes comprises performing a time-domain to frequency-domain transform over the plurality of frequencies;
    comparing the plurality of signal spectral amplitudes to reference levels at the plurality of frequencies; and
    determining a band availability for wireless communication at the predetermined range of frequencies, determining band availability comprising determining whether the plurality of signal spectral amplitudes are indicative of a transmission type different from the WRAN network based on the comparing.

2. The method of claim 1 wherein the comparing comprises determining a correlation between the plurality of signal spectral amplitudes and the reference levels.

3. The method of claim 1 further comprising averaging analog signals.

4. The method of claim 1 further comprising providing reference levels based on a plurality of characteristics associated with a television broadcast frequency.

5. The method of claim 1 further comprising determining a signal type associated with the digital signals.

6. The method of claim 1 further comprising selecting the predetermined range of frequencies.

7. The method of claim 1 wherein the comparing the plurality of signal spectral amplitudes comprises:
    providing a signal indicating that a band is unavailable if any one of the plurality of signal spectral amplitudes is greater or equal to the reference levels at a corresponding frequency.

8. The method of claim 1 further comprising shifting the analog signals.

9. The method of claim 1 wherein the plurality of frequencies includes at least five frequencies.

10. The method of claim 1 wherein the predetermined range of frequencies is associated to a plurality of television channels.

11. The method of claim 1 further comprising selecting the plurality of frequencies.

12. The method of claim 1 wherein the plurality of frequencies includes a pilot audio frequency and a pilot video frequency.

13. The method of claim 1 wherein the wireless analog signals comprises television broadcasting signals.

14. The method of claim 1 wherein the predetermined range has a bandwidth of approximately six megahertz.

15. The method of claim 1 wherein the predetermined range has a bandwidth of approximately 200 kHz.

16. The method of claim 1 wherein the predetermined range is associated with Part 74 devices.

17. The method of claim 1 further comprising filtering the analog signals.

18. The method of claim 1 wherein the modifying the analog signals comprises:
converting analog signals to time-domain signals; and
converting time-domain signals to digital signals using a fast Fourier transform.

19. A system for determining availability of wireless communication links of a first transmission system, the system comprising:
an antenna for wirelessly receiving analog signals being within a predetermined range of frequencies, the analog signals being associated with a time-domain;
a converting component for converting the analog signals to a first plurality of digital signals, the first plurality of digital signals being associated with a time domain at a predetermined range of frequencies, the predetermined frequency range including a plurality of frequencies;
a transforming component for providing a second plurality of digital signals, each of the second plurality of digital signals being associated with a different frequency of the plurality of frequencies in a frequency domain, wherein the transforming component performs a time-domain to frequency domain transform over the plurality of frequencies; and
a detecting component for determining wireless channel availability;
wherein:
the detecting component is configured to determine a plurality of signal strength levels associated with the second plurality of digital signals at a plurality of frequencies; and
the detecting component is further configured to compare the plurality of signal strength levels to reference levels at the plurality of frequencies and to determine a band availability for wireless communication at the predetermined range of frequencies based on the comparing,
the detecting component is further configured to determine whether the plurality of signal strength levels are indicative of a transmission type different from the first transmission system based on comparing.

20. The system of claim 19 further comprising a demodulating the second plurality of digital signals.

21. The system of claim 19 further comprising a low-pass filter for filtering the analog signals.

22. The system of claim 19 further comprising a modifier component for shifting analog signals.

23. The system of claim 19 further comprising a low-noise amplifier for processing the analog signals.

24. The system of claim 19 further comprising a controller for selecting a frequency band for WRAN communication.

25. A method for determining availability of wireless communication links of a first network, the method comprising:
receiving wirelessly analog signals within a predetermined range of frequencies, wherein the predetermined frequency range comprises a plurality of frequencies, and the analog signals are associated with a time-domain;
modifying the analog signals to digital signals, the digital signals being characterized in a frequency domain, the digital signals including a first pilot signal at a first frequency of the plurality of frequencies and a second pilot signal at a second frequency of the plurality of frequencies, wherein modifying comprises performing a time-domain to frequency-domain transform over the plurality of frequencies;
determining a ratio of signal strength between the first pilot signal and the second pilot signal;
comparing the ratio to a predetermined threshold; and
determining a band availability for wireless communication at the predetermined range of frequencies based on the comparing, determining the band availability comprising determining whether a plurality of signal spectral amplitudes derived from the time-domain to frequency-domain transform are indicative of a transmission type different from the first network based on the comparing the plurality of signal spectral amplitudes with further thresholds.

26. The method of claim 25 wherein the first pilot signals comprises an audio pilot signal.

27. The method of claim 25 wherein the first pilot signals comprises a video pilot signal.

28. The method of claim 25 wherein the predetermined threshold is associated with the predetermined range of frequencies.

29. A method for determining availability of wireless communication links of a first network, the method comprising:
receiving wirelessly analog signals within a predetermined range of frequencies, the predetermined range of frequencies comprising a plurality of frequencies, and the analog signals being associated with a time-domain;
converting the analog signals to digital signals, converting comprising performing an analog to digital conversion followed by a time-domain to frequency domain transformation over the plurality of frequencies, the digital signals being characterized in a frequency domain, the digital signals including a first pilot signal at a first frequency and a second pilot signal at a second frequency;
determining a ratio of signal strength between the first pilot signal and the second pilot signal;
comparing the ratio to a predetermined threshold; determining a plurality of signal strength levels associated with the digital signals at a plurality of frequencies;
determining a first band availability metric for wireless communication at the predetermined range of frequencies based on the comparing the ratio;
comparing the plurality of signal strength levels to reference levels at the plurality of frequencies;
determining a second band availability metric for wireless communication at the predetermined range of frequencies based on the comparing the plurality of signal strength levels;
determining a third band availability metric based on the first and second band availability metrics; and
determining whether a plurality of signal spectral amplitudes derived from the time-domain to frequency-domain transform are indicative of a transmission type different from the first network based on the determining the first, second and third band availability metric.

30. The method of claim 29 wherein the first pilot signals is associated with an NTSC broadcast characteristic.

31. The method of claim 29 further comprising assigning a weight to the first band availability metric.

32. The method of claim 1, wherein performing a time-domain to frequency-domain transform comprises performing a Fast Fourier Transform (FFT).

33. The system of claim 19, wherein the time-domain to frequency domain transform comprises a Fast Fourier Transform (FFT).

34. The method of claim 1, wherein the transmission type different from the WRAN network comprises a digital television (DTV) transmission type.

35. The system of claim 19, wherein the transmission type different from the first transmission system comprises a digital television (DTV) transmission type.

* * * * *